United States Patent
Coleman

(10) Patent No.: US 8,171,040 B2
(45) Date of Patent: May 1, 2012

(54) METHOD AND SYSTEM FOR NAVIGATION OF A DATA STRUCTURE

(75) Inventor: Andrew J. Coleman, Petersfield (GB)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 12/353,901

(22) Filed: Jan. 14, 2009

(65) Prior Publication Data

US 2009/0182722 A1 Jul. 16, 2009

(30) Foreign Application Priority Data

Jan. 15, 2008 (EP) .................................. 08150284

(51) Int. Cl.
*G06F 17/30* (2006.01)
(52) U.S. Cl. ......................................................... 707/759
(58) Field of Classification Search .................. None
See application file for complete search history.

(56) References Cited

U.S. PATENT DOCUMENTS

| 2003/0145047 | A1 | 7/2003 | Upton | |
| 2005/0055355 | A1* | 3/2005 | Murthy et al. | 707/100 |
| 2005/0065927 | A1 | 3/2005 | Nouri | |
| 2008/0059439 | A1* | 3/2008 | Fan et al. | 707/4 |

OTHER PUBLICATIONS

Jeow Li Fook. Integrity Constraints and XML: Semantic XPath Query Transformation. 2006. <http://sites.google.com/site/fookid20/thesis-sqt.pdf>.*

* cited by examiner

*Primary Examiner* — Mohammad Ali
*Assistant Examiner* — Syed Hasan
(74) *Attorney, Agent, or Firm* — Steven M. Greenberg, Esq.; Carey, Rodriquez, Greenberg & O'Keefe

(57) ABSTRACT

A method and system are provided for navigation of a data structure. The method includes receiving an input path expression (104) for a query of a data structure (101) to locate one or more elements (110) in the data structure (101) at runtime. The input path expression (104) includes one or more path steps. The method includes accessing a schema (103) of the data structure (101) and obtaining information relating to the one or more elements (110). The path expression (104) is modified to specify an index in one or more of the path steps to limit the number of occurrences of an element located in a path step. In one embodiment, modifying the path expression (104) also expands any wildcard characters and specifies one or more full paths of the elements (110), wherein if there are two or more full paths they are combined by a union operator, and the modified path expression is used to query (111) the data structure (101) at runtime.

14 Claims, 6 Drawing Sheets

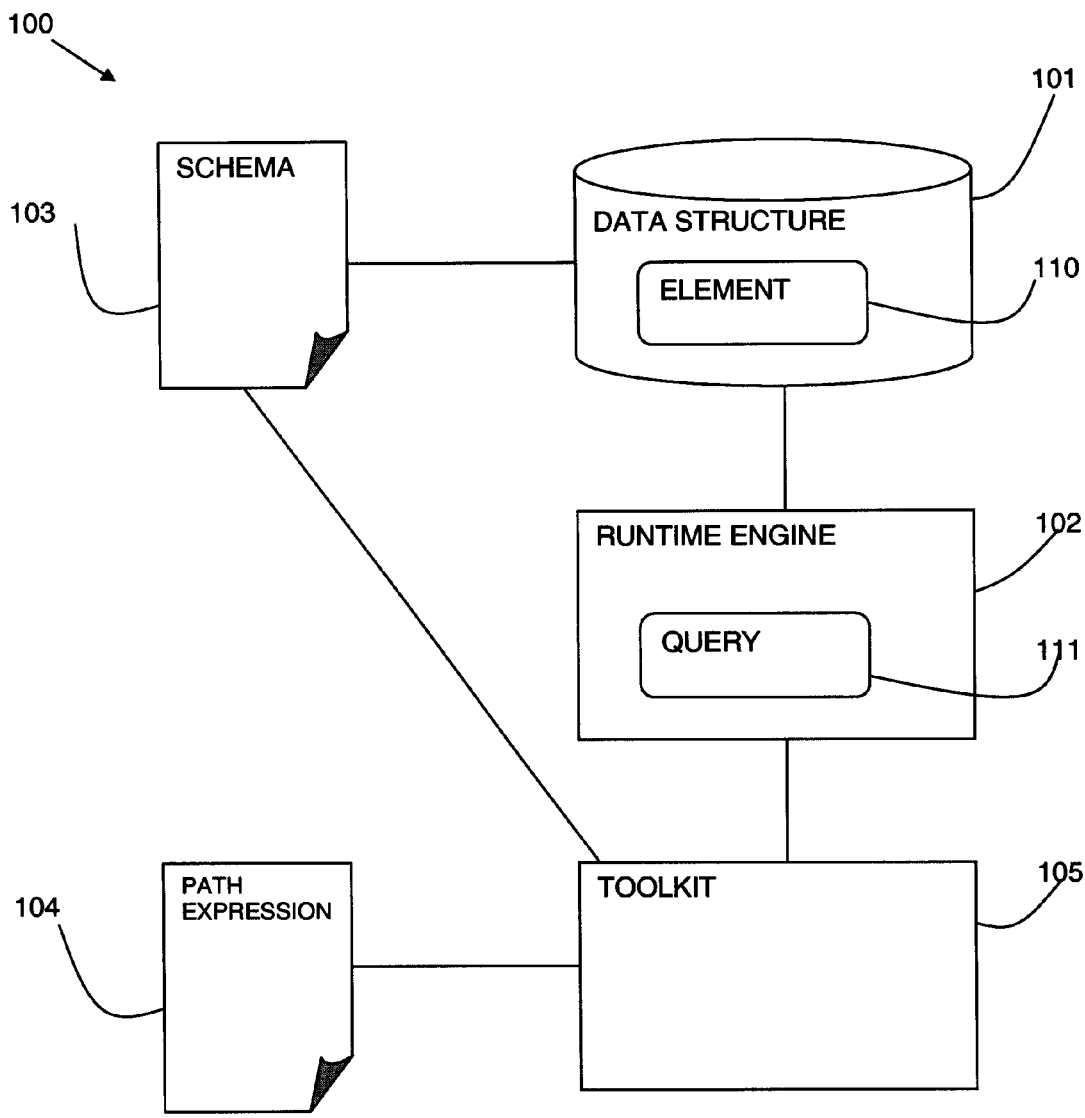

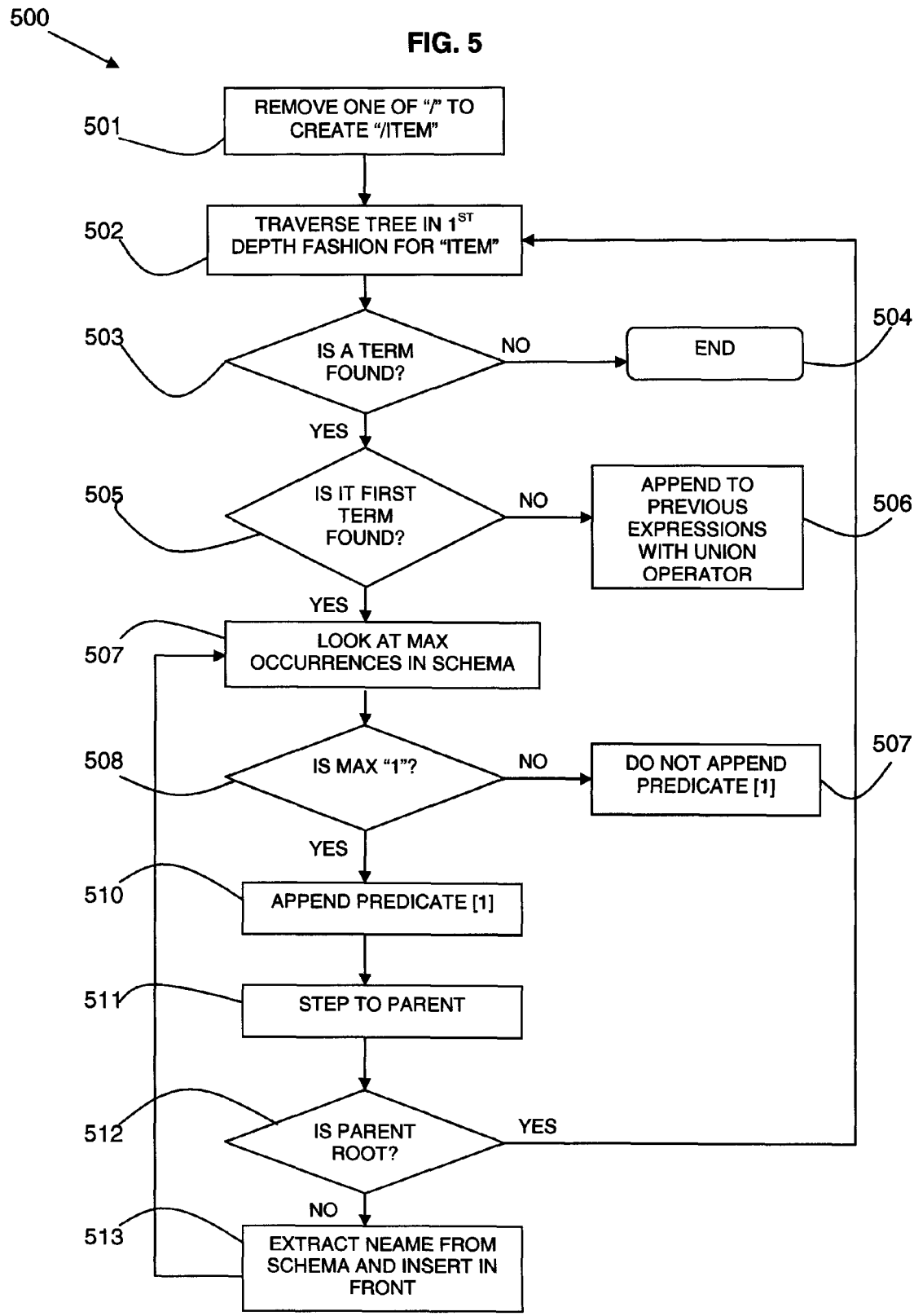

METHOD AND SYSTEM FOR NAVIGATION OF A DATA STRUCTURE

CROSS-REFERENCE TO RELATED APPLICATIONS

This application claims priority under 35 U.S.C. 119(a) to European Patent Application Serial Number EP08150284.1, filed 15 Jan. 2008, entitled "METHOD AND SYSTEM FOR NAVIGATION OF A DATA STRUCTURE", the entirety of which is incorporated herein by reference.

BACKGROUND OF THE INVENTION

1. Field of the Invention

This invention relates to the field of navigation of a data structure. In particular, it relates to navigation using a path expression to query a data structure.

2. Description of the Related Art

Data structures may be queried by using a path expression. There are many database systems that allow storage and querying of XML (extensible markup language) data using a path language, for example, some variation of XPath (XML Path Language). XPath is a W3C standard way of querying a tree data structure. XPath allows XML data to be queried based on path expressions. This document refers to XPath expressions and queries but should be construed as including other forms of path expressions in other path languages. A path expression is any expression that specifies a path through the hierarchical structure of an XML document. The portion of an XML document identified by a path expression is the portion that resides within the structure of the XML document at the end of any path that matches the path expression.

XML documents are often represented as document object model (DOM) structures or trees. Since path queries are evaluated by traversing these structures, a requirement of query optimization is to efficiently decrease the number of traversed nodes.

XML schema define the precise structural format of an XML document. This schema might not be available for use at runtime.

Consider a path runtime engine that does not have access to the schema of the document it is querying, only the parsed DOM tree. The authoring tool where the user enters a free-form path expression (i.e. not via a path builder) does have access to the schema.

It would be beneficial to use the descendant (//) path axis for to allow the user to find any element within the XML document by name without having to specify the full path to it. However, the descendant axis is very inefficient for the runtime engine because it needs to traverse the whole DOM tree in order to find all occurrences of this element.

"Schema-based Optimization of XPath Expression" by April Kwong and Michael Gertz, Department of Computer Science, University of California at Davis discloses optimization of XPath Expressions using path equivalent classes generated from a schema. The optimization method includes the expansion of wildcards in XPath expressions.

BRIEF SUMMARY OF THE INVENTION

According to a first aspect of the present invention there is provided a method for navigation of a data structure, comprising: receiving an input path expression for a query of a data structure to locate one or more elements in the data structure at runtime, the input path expression includes one or more path steps; accessing a schema of the data structure and obtaining information relating to the one or more elements; modifying the path expression to specify an index in one or more of the path steps to limit the number of occurrences of an element located in a path step; and using the modified path expression to query the data structure at runtime.

According to a second aspect of the present invention there is provided a system for navigation of a data structure, comprising: means for receiving an input path expression for a query of a data structure to locate one or more elements in the data structure at runtime, the input path expression including one or more path steps; means for accessing a schema of the data structure and obtaining information relating to the one or more elements; means for modifying the path expression to specify an index in one or more of the path steps to limit the number of occurrences of an element located in a path step; and means for outputting the modified path expression for use at runtime to query the data structure.

According to a third aspect of the present invention there is provided a computer program product stored on a computer readable storage medium, comprising computer readable program code means for performing the steps of: receiving an input path expression for a query of a data structure to locate one or more elements in the data structure at runtime, the input path expression including one or more path steps; accessing a schema of the data structure and obtaining information relating to the one or more elements; modifying the path expression to specify an index in one or more of the path steps to limit the number of occurrences of an element located in a path step; and using the modified path expression to query the data structure at runtime.

There is preferably provided a solution which improves the processing time of path-based queries by providing a way for path-based queries to retrieve data from XML documents without incurring a complete scan of the base tables and construction of expensive memory data structures. A solution is preferably provided which obtains and uses information relating to the repetition of elements in a query.

The described method and system enable querying a data structure having an underlying model where elements within the data structure may repeat and where the navigation of the data structure can be optimised by knowing whether there is repetition and how much repetition.

This invention preferably takes the original path expression and, using the schema, converts it to a form that can be more efficiently processed by a runtime engine. A schema contains the information required to trace any element back to the document root, and hence can generate the full path to the element. This preferably allows the runtime engine to navigate to it directly rather than to "search" for the element.

BRIEF DESCRIPTION OF THE SEVERAL VIEWS OF THE DRAWINGS

Embodiments of the present invention will now be described, by way of examples only, with reference to the accompanying drawings in which:

FIGS. 1A and 1B are schematic diagrams of a system in accordance with the present invention;

FIG. 5 is a flow diagram of an example process in accordance with the present invention.

DETAILED DESCRIPTION OF THE INVENTION

Figure 1B:
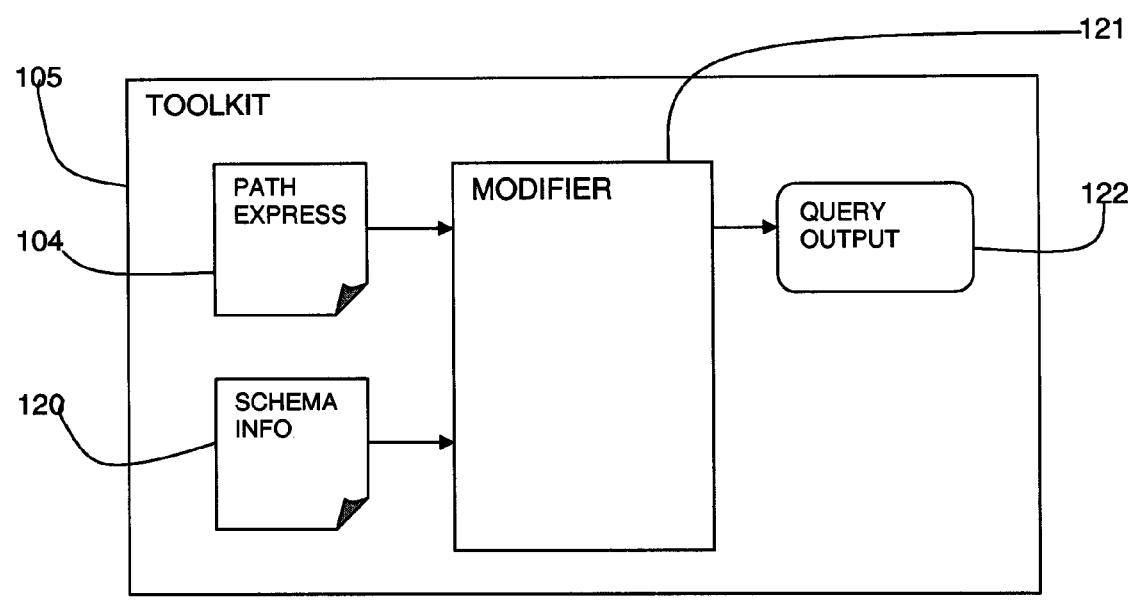

Referring to FIG. 1A, a schematic diagram illustrates a system 100 in which a data structure 101 is queried by a runtime engine 102 to locate one or more elements 110 in the data structure 101.

The data structure 101 may be, for example, an XML document represented as a document object model (DOM) tree. In another example, the data structure 101 is non-XML data parsed into a similar tree data structure. In one embodiment, the data structure 101 is a message being queried by a message broker. The data structure 101 has an associated schema 103.

A path expression 104 is input as a query 111 to the runtime engine 102 which searches the data structure 101 for occurrences of the path expression 104 to locate the one or more elements 110.

A toolkit 105 is used to structure the query 111 which is then deployed to the runtime engine 102. In the described system 100, the toolkit 105 accesses the schema 103 to modify the path expression 104.

Using the information from the schema 103 of the data structure 101 being queried, the path expression 104 is modified to include the full path to the element 110 being queried and other information. This helps in tracing the element 110 rather than searching for the element 110 and thus increases the efficiency of the runtime engine 102. Also, if the schema 103 indicates the number of occurrences of an element 110 being queried, then the runtime engine 102 can stop after it finds the specific number of occurrences of that particular element 110.

Referring to FIG. 1B, a detailed figure of the toolkit 105 is shown in which a path expression 104 is input. The schema is referenced to obtain schema information 120. A modifier 121 modifies the path expression 104 using the schema information 120 to provide a query output 122. The query output 122 is used by a runtime engine to query a data structure. For example, the schema may be used to determine the number of occurrences of the elements being queried and this information is then used by the modifier 121 to add a predicate to the query output 122.

Figure 2:
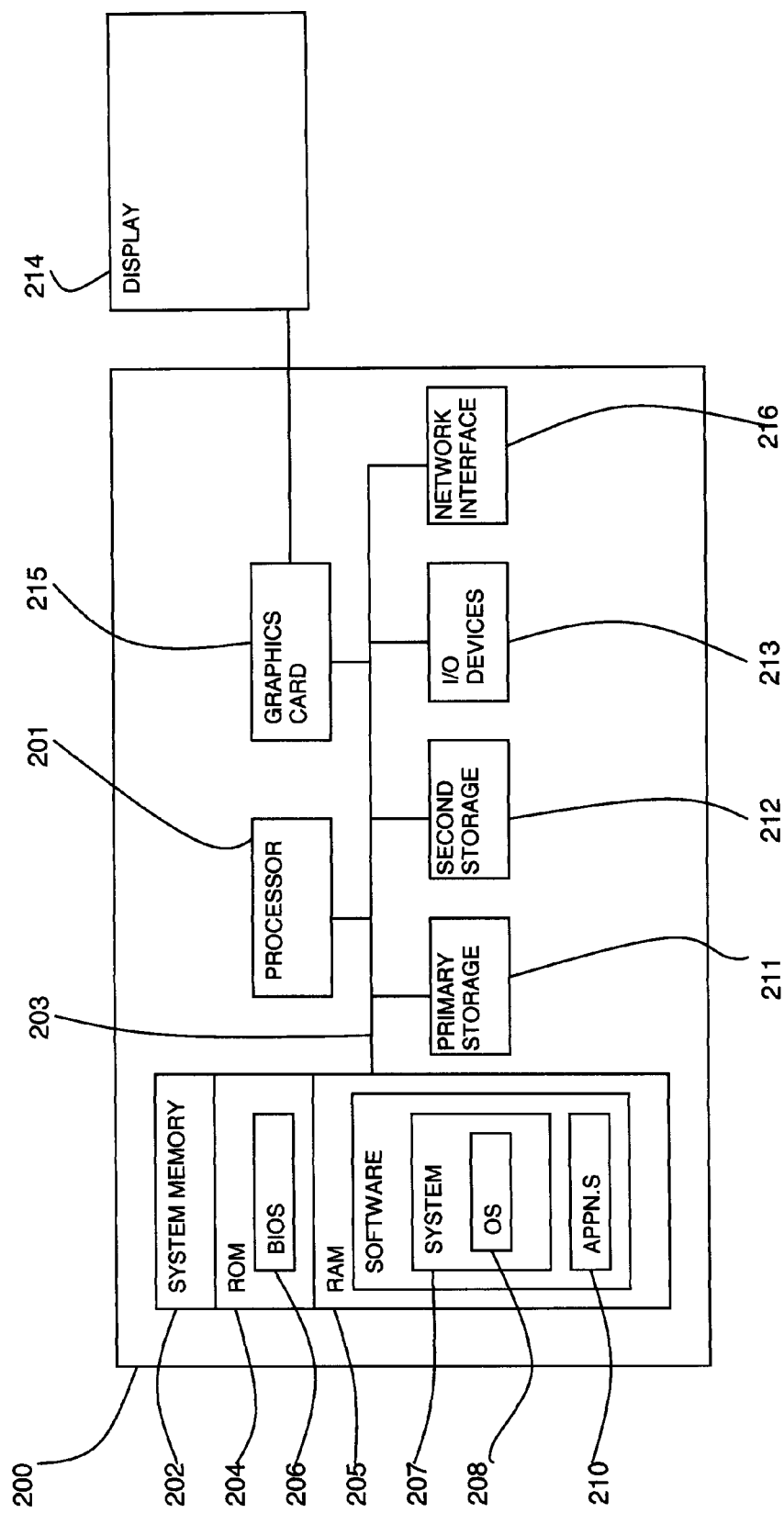
FIG. 2 is a block diagram of a computer system in which the present invention may be implemented.

Referring to FIG. 2, an exemplary system for implementing the toolkit 105 includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

A path language is based on a tree representation of a data structure (such as an XML document), and provides the ability to navigate around the tree, selecting nodes by a variety of criteria. A path expression is written as a sequence of steps to get from one node, the current "context node", to another node or set of nodes. The steps are separated by "/" (i.e. path) characters. Each step has three components: axis specifiers, node tests, and predicates.

The simplest path takes a form such as:

/A/B/C which selects C elements that are children of B elements that are children of the A element that forms the outermost element of the data structure.

More complex expressions can be constructed by specifying an axis other than the default 'child' axis, a node test other than a simple name, or predicates, which can be written in square brackets after any step. For example, the expression

A//B/*[1]

selects the first element ('[1]'), whatever its name ('*'), that is a child ('/') of a B element that itself is a child or other, deeper descendant ('//') of an A element that is a child of the current context node (the expression does not begin with a '/'). If there are several suitable B elements in the document, this actually returns a set of all their first children. The axis specifier indicates navigation direction within the tree representation of the data structure.

Expressions of any complexity can be specified in square brackets as predicates, which must be satisfied before the preceding node will be matched by a path expression. There is no limit to the number of predicates in a step, and they need not be confined to the last step in a path. They can be nested to any depth. Paths specified in predicates begin at the context of the current step (i.e. that of the immediately preceding node test) and do not alter that context. All predicates must be satisfied for a match to occur. Predicate order is significant, and each predicate filters a location step's selected node-set in turn.

An XML schema is a description of a type of XML document, typically expressed in terms of constraints on the structure and content of documents of that type, above and beyond the basic syntax constraints imposed by XML itself. An XML schema provides a view of the document type at a relatively high level of abstraction. Schemas can also be used in relation to non-XML data structures. For example, by modelling the document structure using XML Schema and then using XSD (XML Schema Definition) annotations to describe the physical format of each element.

There are languages developed specifically to express XML schemas. The Document Type Definition (DTD) language, which is native to the XML specification, is a schema language that is of relatively limited capability, but that also has other uses in XML aside from the expression of schemas. Two other very popular, more expressive XML schema languages are XML Schema (W3C) and RELAX NG (REgular LAnguage for XML Next Generation).

The mechanism for associating an XML document with a schema varies according to the schema language. The association may be achieved via markup within the XML document itself, or via some external means.

In the described system, the path expression may be modified in three possible ways as follows:
1. Simple expansion of wildcard "*" or descendent axis "//" where the schema suggests only one possible resolution;
2. Expansion of wildcard "*" or descendent axis "//" into an expression with multiple paths combined with a path union operator "|" where the schema suggests more than one possible resolution; and
3. Insertion of indices ([1]) where the schema suggests an element can appear only once. Similarly, insertion of [position( )<=n], where schema suggests an element can appear n times, where n>1.

For illustration, a worked example is given using the following XML document:

```
<?xml version="1.0" encoding="UTF-8"?>
<document>
    <topic>
        <list>
            <item>...</item>
            <item>...</item>
            <item>...</item>
        </list>
    </topic>
    <index>
        <item>...</item>
        <item>...</item>
    </index>
</document>
```

This document might be modelled by the following XML Schema (XSD):

```
<?xml version="1.0" encoding="UTF-8"?>
<xsd:schema xmlns:xsd="http://www.w3.org/2001/XMLSchema">
    <xsd:element name="document">
        <xsd:complexType>
            <xsd:sequence>
                <xsd:element ref="topic"/>
                <xsd:element ref="index"/>
            </xsd:sequence>
        </xsd:complexType>
    </xsd:element>
    <xsd:element name="topic">
        <xsd:complexType>
            <xsd:sequence>
                <xsd:element ref="list"/>
            </xsd:sequence>
        </xsd:complexType>
    </xsd:element>
    <xsd:element name="list">
        <xsd:complexType>
            <xsd:sequence>
                <xsd:element minOccurs="0" maxOccurs="unbounded"
                    ref="item"/>
            </xsd:sequence>
        </xsd:complexType>
    </xsd:element>
    <xsd:element name="item">
        <xsd:complexType/>
    </xsd:element>
    <xsd:element name="index">
```

-continued

```
        <xsd:complexType>
            <xsd:sequence>
                <xsd:element minOccurs="0" maxOccurs="unbounded"
                    ref="item"/>
            </xsd:sequence>
        </xsd:complexType>
    </xsd:element>
</xsd:schema>
```

The schema describes the allowable structure of the XML document including the minimum and maximum occurrences of each element. The schema represents the document structure (schema tree) 300 shown in FIG. 3.

Figure 3:
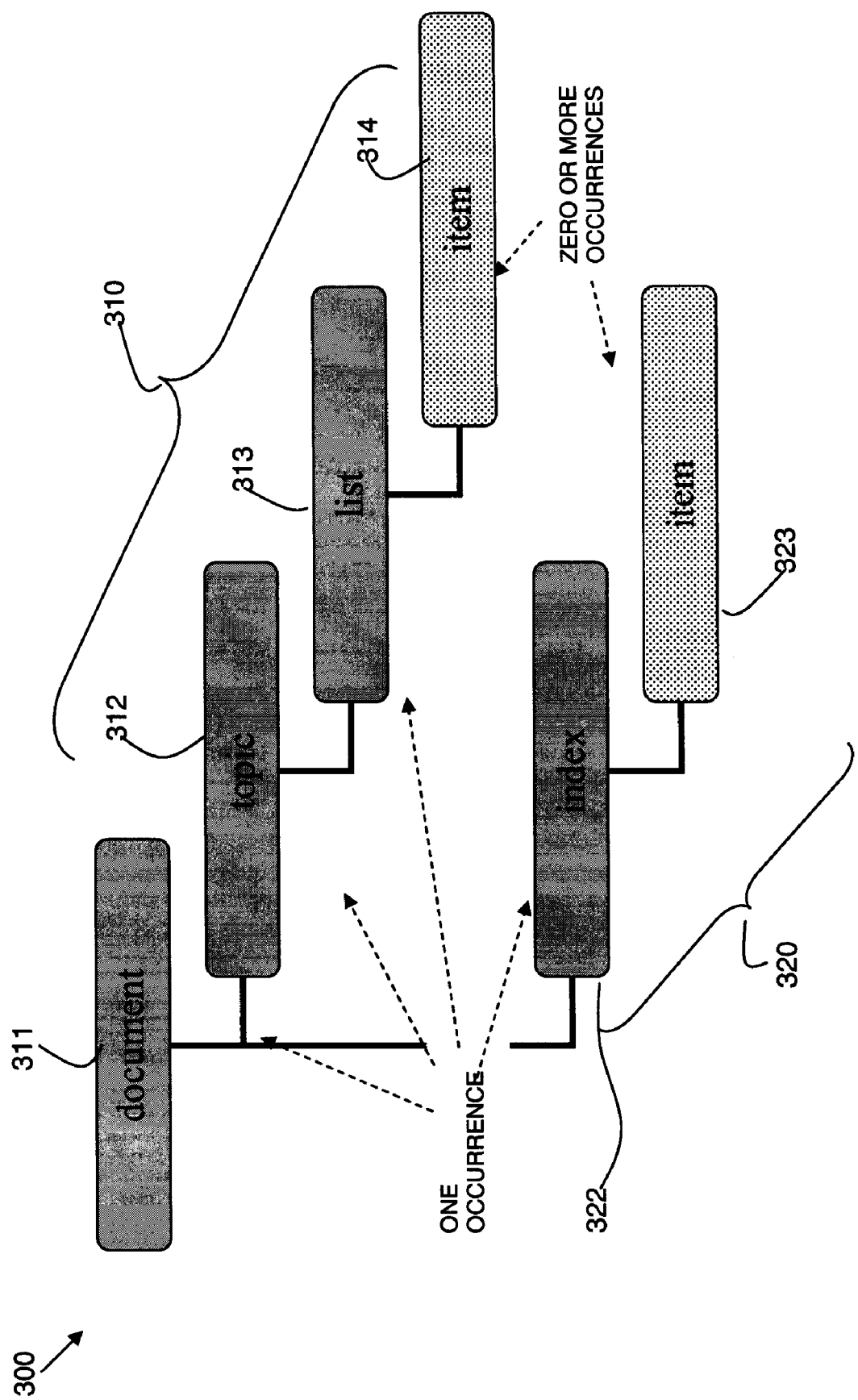
FIG. 3 is a schematic diagram of a document structure in accordance with the present invention.

The document structure 300 shown in FIG. 3 includes two branches 310, 320 from a root node 311 of "document". The first branch 310 includes a child node 312 "topic" of the root node 311, with a child node 313 "list", which may have a child node 314 "item". The second branch 320 includes a child node 322 "index" of the root node 311, which may have a child node 323 "item". The nodes 314, 323 of "item" may have zero or more occurrences. The other nodes 311, 312, 313, 322 can only have one occurrence.

Figure 4:
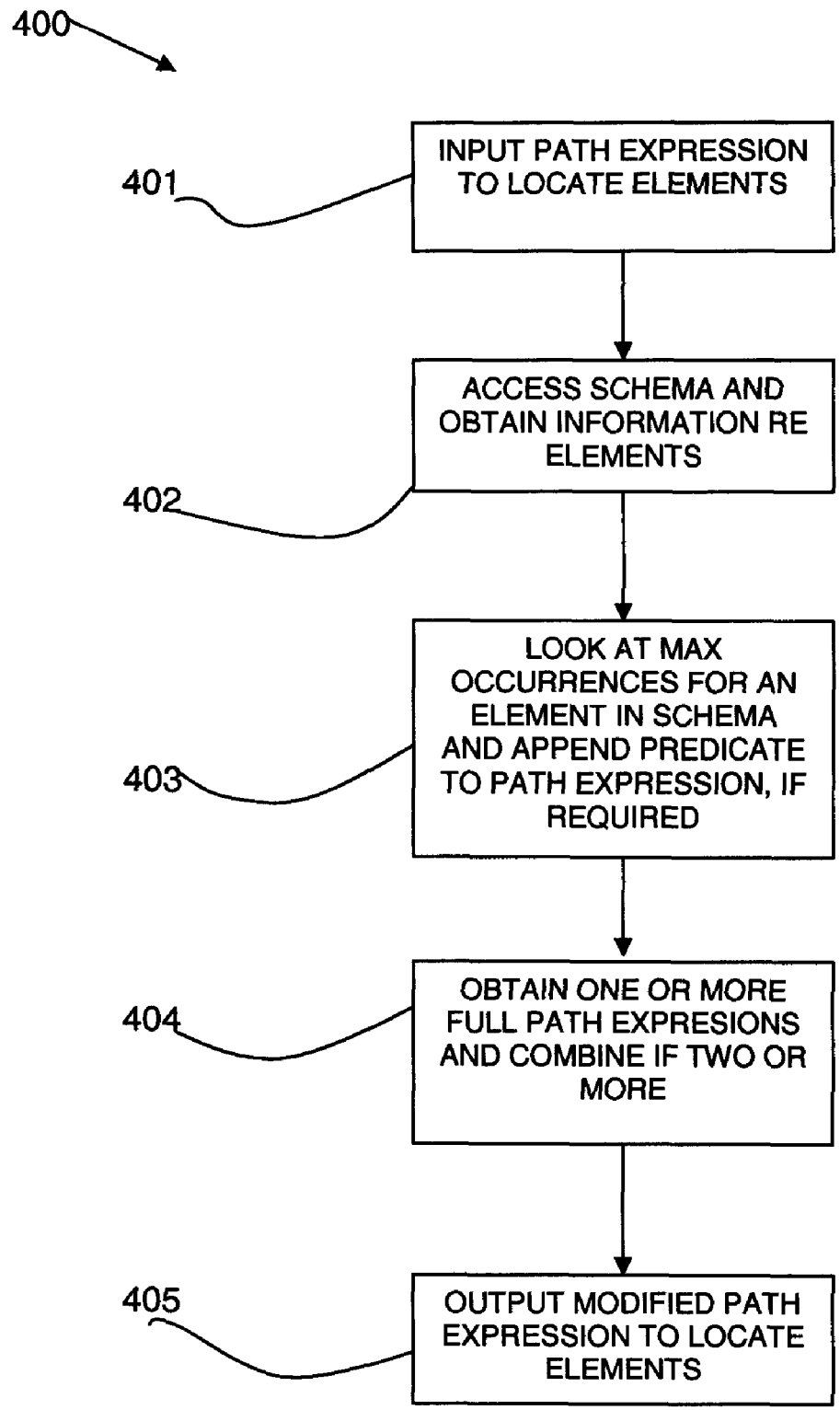
FIG. 4 is a flow diagram of a general process in accordance with the present invention.

Referring to FIG. 4, a flow diagram 400 shows the general process for navigating a data structure. A path expression is input 401 to locate one or more elements in a data structure. The schema for the data structure is accessed 402 and information relating to the elements of the path expression is obtained. The maximum occurrences 403 for an element is referenced from the schema and a predicate is appended to the path expression, if required to limit the occurrences. One or more full path expressions are obtained 404 and combined if there are two or more.

The path expression is modified with reference to the obtained information relating to the elements. The modified path expression is output 405 to a runtime engine for locating the one or more elements in the data structure.

In the worked example, given an XPath expression '//item', the following steps as shown in the flow diagram of FIG. 5 are carried out to expand out the descendant axis '//' and to add the 'select only first' predicate '[1]':

1. Remove 501 one of the '/' characters to create the initial optimised expression '/item'.
2. Traverse 502 the schema tree in a 'depth first' fashion searching for an element named 'item'.
3. Determine 503 if an element is found, if so continue, if not the process ends 504.
4. Determine 505 if it is the first element found. If so continue, if not append 506 to the previous expression with a union operator.
5. When an 'item' element is found, look 507 at the 'maxOccurs' attribute in the schema. Determine 508 if it is '1' (which is the default if this attribute is not present), and if so append 509 the predicate '[1]' to the element name. If it greater than '1' or 'unbounded', then do not append 510 a predicate.
6. Step to the parent 511 of the current element in the schema tree.
7. Determine 512 if the parent is the root node. If so, loop to step 502 to search for another 'item'.
8. If the parent is not a root node, extract the name 513 from the schema and insert it in front of the previous step separated by a '/' separator.
9. Loop back to step 507 to append a predicate to the element name as necessary and step to the next parent. Continue until the 'root' element is reached.

10. If another 'item' element is found, create another optimized path expression for this branch of the tree. Append it 506 to the previous expression separated by a '|' union operator. Continue traversing until no more occurrences of 'item' are found in the schema tree.

The following shows the building up of the optimized expression as the above steps are followed (original expression '//item', the change at each step is shown as underlined):

/item
/list/item
/<u>list</u>[1]/item
/top<u>ic</u>/list[1]/item
/<u>topic</u>[1]list[1]/item
/do<u>cument</u>/topic[1]/list[1]/item
/<u>document</u>[1]/topic[1]/list[1]/item
/document[<u>1</u>]/topic[1]/list[1]/item|/item
/document[1]/topic[1]/list[1]/item|/<u>index</u>/item
/document[1]/topic[1]/list[1]/item|/<u>index</u>e[1]/item
/document[1]/topic[1]/list[1]/item|/
   document/index[1]/item
/do<u>cument</u>[1]/topic[1]/list[1]/item|/document[1]/index[1]/item In the more generic case, the general principle is to step through the XPath expression, one element step at a time and replace any wildcard '*' with an element name and to replace any descendant axis '//' with a fully qualified path. If more than one element matches the wildcard, then each is considered in turn. Subsequent steps might show that a particular match cannot lead to a valid path, in which case that one is discarded. If multiple matches are possible, then each expression will be combined, separated by the XPath union operator '|'.

Consider the expression '*/topic//item':
1. Set the 'schema cursor' to the root of the schema tree and the 'XPath cursor' to the first step of the original XPath expression.
2. Traverse the schema tree, depth first from the schema cursor position.
3. If the cursor element in the schema tree matches the XPath step (wildcard matches any element) then,
   a. Append the element name (from the schema tree in the case of a wildcard) to the optimised XPath expression.
   b. Look at the 'maxOccurs' attribute in the schema. If it is '1' (which is the default if this attribute is not present), then append the predicate '[1]' to the element name. If it greater than '1' or 'unbounded', then do not append a predicate.
   c. If the XPath cursor is at the last step in the original XPath expression then stop recursing, add the new expression built in this stage to the list of parts and continue traversing from stage 2.
   d. Move XPath cursor to the next step in the original XPath expression. If the next step is separated by a descendant axis '//' then,
      i. Expand this out using the algorithm previously described (define 'root' element in the expansion algorithm to be the element before the '//' here).
      ii. If the expansion results in multiple paths separated by a union operator '|' then the optimised expression up to now needs replicating and appending to the start of each part. Each part must be treated separately for the remainder of this algorithm. (For example, '/document//item' would produce '/document[1]//item' before expansion. Expanding '//item' from this cursor position will produce '/topic[1]/list[1]/item|/index[1]/item'. After this step, the two parts will be /document[1]/topic[1]/list[1]/item and /document[1]/index[1]/item, each part to be treated separately.)
   e. For each child of the schema cursor, in turn, set the schema cursor to the child. Recurse back to stage 3. (Each child at this stage will represent separate parts in the optimised expression, most of which will probably be dead-ends and be abandoned. All remaining parts at the end of the algorithm are combined using the union operator '|').

Otherwise,
   a. Abandon this part of the path that was built since the algorithm was at stage 2. Reset the schema cursor and XPath cursor to where they were when previously at stage 2. Continue traversing from stage 2.

4. Combine the list of parts separated by union operators '|' to produce the final expression.

The following shows the building up of the optimized expression as the above steps are followed (original expression '*/topic//item', the change at each step is underlined):

document
<u>documenta</u>[1]
document[<u>1</u>]/topic
document[1]/<u>topic</u>[1]
   /item
   /<u>list</u>/item
   /<u>list</u>[1]/item
document[1]/topic[1]/<u>list</u>[1]/item When an expression such as "//item" is entered, the whole data structure has to be traversed to find any occurrences of this. However, this can be converted to a form that allows the runtime engine to navigate directly to the item by specifying the full path expression "/document/topic/list/item" obtained by referring to the schema.

If the schema specifies that the item does not repeat then an explicit index can be placed on each path step to tell the runtime engine that it can stop searching when it has found the first match, for example, "/document[1]/topic[1]/list[1]/item". Note that "item" is a repeating element, but its ancestor elements are not.

If a named element "item" appears in different parts of the data structure, then they can be combined using the union operator "|". For example, "/document[1]/topic[1]/list[1]/item|/document[1]/index[1]/item". This last expression is equivalent to the original "//item" for a given schema, but is in a form that can be more efficiently processed by a runtime engine that does not have access to that schema.

It is possible for the schema to specify that an element occurs a given number of times, for example, twice. The XPath step '/element[2]' will return the second element rather than the first two elements. To get the correct result, [position( )<=2] should be appended.

In conventional systems, a user specifies "/aaa/bbb" to indicate that they would like the runtime engine to navigate the tree and to return all matching elements. Sometimes there may be only one element to return but nevertheless, the XPath parser conventionally has to parse the complete tree and therefore do a lot of unnecessary processing. The user may only want a certain number of the elements, for example, the first, and this can be predicated in the query to indicate this, for example "aaa/bbb[1]". Previously, the parser would still bring back the complete list but would then narrow the set down to return the number required to the user.

In the described system, the toolkit accesses the data structure schema which is used to determine the number of occurrences of the elements being queried. This information is then used to add a predicate to each query. Thus, if it is determined that only two "aaa/bbb" elements exist and that the user is querying for all such elements, then the query can be modified to indicate to the parser that it should only look for the first two elements and then stop parsing.

The described method and system may be applied in ESB (Enterprise Service Bus) and XML processing products including runtime engines in the form of message brokers querying a message.

The method may also be provided as a service to a client over a network for improving a modified path expression for use as a query.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for navigation of a data structure, comprising:
   receiving an input path expression for a query of a data structure to locate one or more elements in the data structure at runtime, the input path expression including at least one wildcard character or descendent axis;
   accessing a schema of the data structure and obtaining information relating to the one or more elements;
   modifying the input path expression by
      expanding the wildcard character or descendent axis where the schema suggests only one possible resolution,
      expanding the wildcard character or descendent axis into an expression with multiple paths combined with a path union operator where the schema suggests more than one possible resolution, and
      inserting a predicate of one where the schema suggests an element can appear only once, and a position( )=n, where schema suggests an element can appear n times, where n>1; and
   using the modified path expression to query the data structure at runtime.

2. The method as claimed in claim 1, wherein the predicate is appended to a corresponding path element name.

3. The method as claimed in claim 2, wherein obtaining information includes looking at an attribute indicating maximum occurrences of an element in the schema and if the attribute is not present, appending the predicate of one to the path element name.

4. The method as claimed in claim 1, wherein the schema contains information to trace an element of the data structure to its root.

5. The method as claimed in claim 1, wherein the input path expression is an XPath expression and the data structure is a document object model structure with an associated schema.

6. A computer system for navigation of a data structure, comprising:
   a processor and memory, the processor being configured to perform:
   receiving an input path expression for a query of a data structure to locate one or more elements in the data structure at runtime, wherein the input path expression includes at least one wildcard character or descendent axis;
   accessing a schema of the data structure and obtaining information relating to the one or more elements;
   modifying the input path expression by
      expanding the wildcard character or descendent axis where the schema suggests only one possible resolution,
      expanding the wildcard character or descendent axis into an expression with multiple paths combined with a path union operator where the schema suggests more than one possible resolution, and
      inserting a predicate of one where the schema suggests an element can appear only once, and a position( )=n, where schema suggests an element can appear n times, where n>1; and
   outputting the modified path expression for use at runtime to query the data structure.

7. The system as claimed in claim 6, wherein the predicate is appended to a corresponding path element name.

8. The system as claimed in claim 6, wherein obtaining information includes looking at an attribute indicating maximum occurrences of an element in the schema and if the attribute is not present, appending the predicate of one to the path element name.

9. The system as claimed in claim 6, wherein the schema contains information to trace an element of the data structure to its root.

10. The system as claimed in claim 6, wherein the input path expression is an XPath expression and the data structure is a document object model structure with an associated schema.

11. The system as claimed in claim 6, wherein the system includes a toolkit for structuring queries to be deployed at runtime.

12. The system as claimed in claim 6, including a runtime engine without access to the schema wherein the runtime engine uses the modified path expression to locate the one or more elements in the data structure.

13. The system as claimed in claim 12, wherein the runtime engine is a message broker and the data structure is a message.

14. A computer program product stored on a computer readable storage medium, comprising computer readable program code means for performing the steps of:
   receiving an input path expression for a query of a data structure to locate one or more elements in the data structure at runtime, the input path expression including at least one wildcard character or descendent axis;
   accessing a schema of the data structure and obtaining information relating to the one or more elements;
   modifying the input path expression by
      expanding the wildcard character or descendent axis where the schema suggests only one possible resolution,
      expanding the wildcard character or descendent axis into an expression with multiple paths combined with a path union operator where the schema suggests more than one possible resolution, and
      inserting a predicate of one where the schema suggests an element can appear only once, and a position( )=n, where schema suggests an element can appear n times, where n>1; and
   using the modified path expression to query the data structure at runtime.

* * * * *